Ludwig W. Blau
William B. Lewis, Inventors

By W. F. Weigester, Attorney

Patented July 11, 1939

2,165,214

UNITED STATES PATENT OFFICE 2,165,214

GEOPHYSICAL PROSPECTING WITH SHORT ELECTROMAGNETIC WAVES

Ludwig W. Blau and William B. Lewis, Houston, Tex., assignors to Standard Oil Development Company, a corporation of Delaware Application June 26, 1936, Serial No. 87,462

6 Claims. (Cl. 250—1)

This invention pertains to a method of locating oil producing regions by observing characteristic absorption bands in short radio waves, or in light waves, which are caused to traverse the region. The absorption bands are due to the presence of hydrocarbon gases which diffuse through the soil overlying a petroleum deposit and finally escape into the atmosphere.

The use of short radio waves in prospecting for oil has been suggested previously, the method consisting in reflecting the waves from some surface underlying the oil stratum and observing the characteristic absorption bands in the reflected beams. This method, due to inherent practical difficulties, has not attained wide usage. The high absorption of energy by the soil from electro-magnetic waves of requisite frequency (i. e. around 1000 megacycles) introduces great difficulties in transmitting enough energy to be detected. It is estimated that the attenuation of a wave reflected from 10,000 feet below the earth's surface would reduce its energy to $10^{-20}$ of its initial value. A brief calculation will show that in order to receive a billionth of a watt of reflected energy, the output of the oscillator sending out the waves would have to be one hundred billion watts.

The object of this invention is to overcome this inherent difficulty by making use of the observed fact that hydrocarbon gases diffuse from petroleum bearing strata upward to the surface of the ground. Soil gas analysis has shown these hydrocarbon gases present in measurable concentrations in soil near the surface in oil producing regions.

Other objects will be apparent from the specification and from the accompanying drawings, in which latter—

In one of the embodiments of this invention, the absorption spectrum of the atmosphere to short radio waves or to light waves is determined by directing a beam of short radio waves, or light, through the atmosphere across the surface of the earth for several miles and analyzing the spectrum by means of a suitable detector or spectrometer at different points along its path. This operation is preferably performed at night. Alternatively, one can observe the absorption spectrum of the sun's light during the day.

In another embodiment of the invention, short electro-magnetic waves are directed upon the surface of the ground which has previously been cleared of vegetation. Only a small area is necessary, not exceeding a few square feet. The directed beam penetrates the soil somewhat and energy is reflected back to the receiver. By varying the frequency of the transmitted wave and observing the corresponding behavior of reflected energy, the presence or absence of hydrocarbon gases in the soil is indicated. Comparison is made with reflections from a metal plate placed on top of the cleared area, in order to check on the energy output of the transmitter.

A third embodiment of the invention comprises means for directing short radio waves through a soil sample or sample of soil gas. The waves are directed in a narrow beam through a tube or suitable container holding the sample under investigation. The presence of hydrocarbons is shown by the appearance of the characteristic absorption bands. Comparison is made with similar tubes containing known quantities of hydrocarbons.

For the purpose of this specification, electromagnetic waves are defined to include radio waves and light waves.

Figure 1:
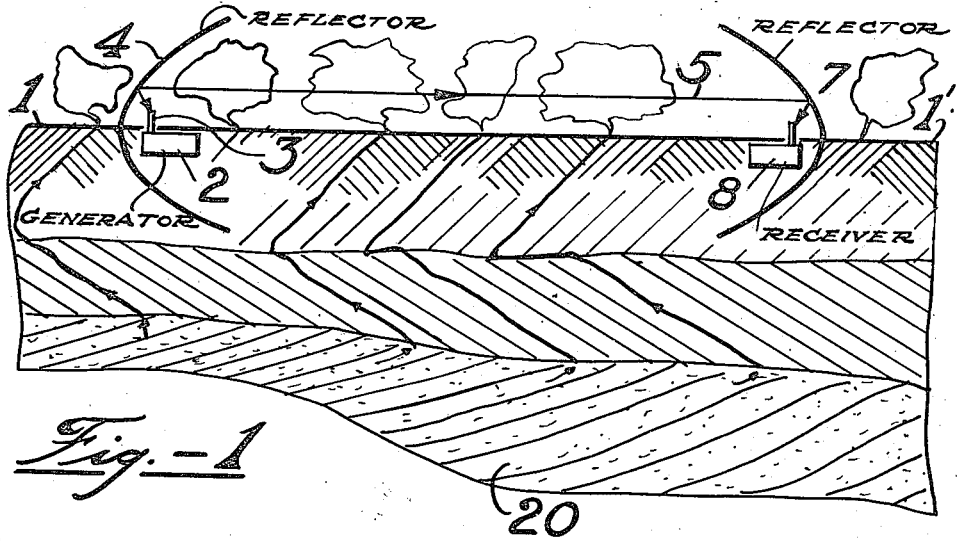
Fig. 1 is a diagrammatic representation of a directed beam of short radio waves traversing the atmosphere above the earth.

Apparatus for determining the absorption spectrum of the atmosphere to short radio waves is illustrated in Fig. 1, in which reference numerals 1—1' designate the surface of the earth having a subsurface oil bearing stratum 20. Hydrocarbon gases seep upwardly through the earth from the soil bearing stratum 20 and diffuse into the atmosphere above the earth. The hydrocarbon vapors in the atmosphere above the oil bearing stratum 20 are determined as follows: A short wave generator 2 delivers short waves from an antenna rod 3 against a reflector 4. The reflected short radio waves reflected from the reflector 4 pass along the line 5 through the atmosphere parallel with the earth's surface for a suitable distance, and are picked up by a reflector 6 which reflects the waves against an antenna rod 7. A receiver 8 receives the waves from the reflector 6. The electro-magnetic waves sent out from the generator 2 may be sent out at different frequencies.

Figure 2:
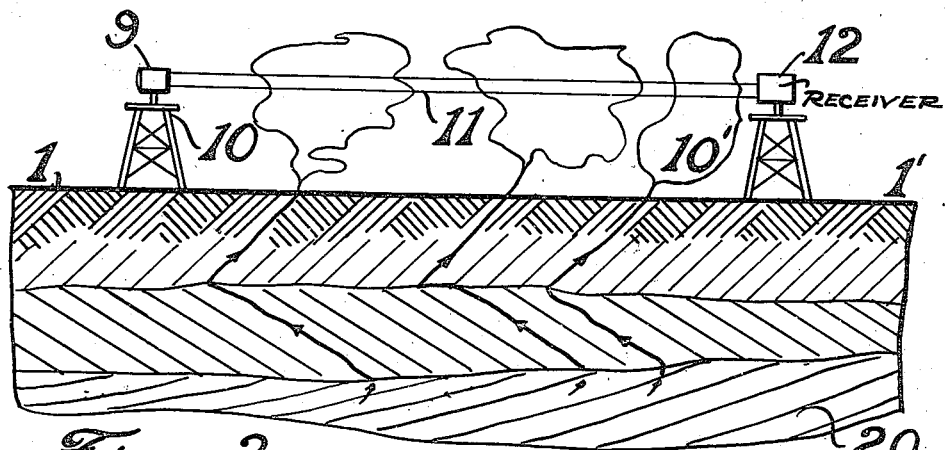
Fig. 2 is a vertical sectional view through the earth showing diagrammatically apparatus for causing a beam of light to traverse the atmosphere above the earth and be analyzed by a receiver shown in Fig. 3.

A form of apparatus suitable for use in determining the absorption spectrum of the atmosphere to light waves is illustrated in Fig. 2, in which the surface of the earth is indicated at 1—1' and 20 is the oil bearing layer. A source of light 9 is mounted upon a stand 10 and directs a beam of light 11 through the atmosphere parallel with the earth's surface for a suitable distance to a receiver 12 carried by stand 10'.

Figure 3:
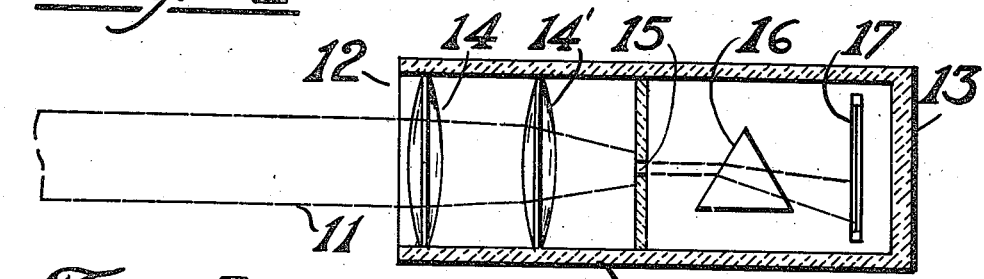
Fig. 3 shows schematically an apparatus for analyzing the spectrum of the light beam after it has passed through the atmosphere over an oil producing area.

The receiver 12 is illustrated in Fig. 3 and comprises a housing 13 containing lens 14 and 14' for collimating the beam. The thus treated beam of light is passed through a slit 15 into a prism 16 which disperses the beam into its component frequencies upon a screen 17. Absorption of the beam of light by the atmosphere is affected by any hydrocarbon gases contained in the atmosphere. Consequently, the spectrum projected on screen 17 contains absorption bands characteristics of hydrocarbon gases in the atmosphere through which the beam of light has passed. The prism 16 may be replaced by a ruled grating, an echelon grating or any optical equivalent. The screen 17 may hold a photographic plate sensitive to the proper wave-lengths, whereby the component frequencies of the light beam can be permanently recorded. A thermocouple or any other suitable detecting means can be used if desired. It will be understood that a plurality of receivers can be used at different distances from the source of light or short waves and that they can be disposed or moved around the source of light or radio waves as an axis.

Figure 4:
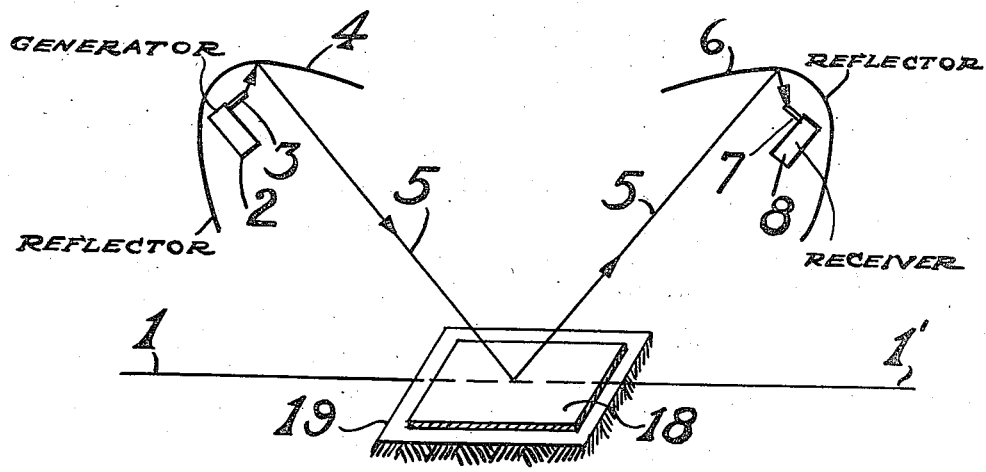
Fig. 4 shows schematically an arrangement whereby short radio waves can be reflected from a metal plate, which can be removed, giving subsequent reflection from the earth.

Referring to Fig. 4, a short wave generator 2 is illustrated which directs radio waves from an antenna 3 against a reflector 4 and along the path 5 against the soil at 19. The soil 19 is cleared of vegetation and selected as a location which may contain soil gases containing hydrocarbon vapors which have seeped upwardly from a subsurface oil bearing stratum. The short electro-magnetic waves reflected from the soil have been affected by any hydrocarbon gases contained in the soil. The thus treated waves are directed against reflector 6 to an antenna 7 and receiver 8, and the absorption of the waves is noted. For purposes of comparing the energy reflected from the ground at different frequencies, a metal plate 18 is disposed on the soil at 19, and the energy of the waves reflected therefrom noted. Thus, it is possible to take into consideration any change in output energy with frequency change, by comparing the energy reflected from the ground at different frequencies with that reflected from the plate.

Figure 5:
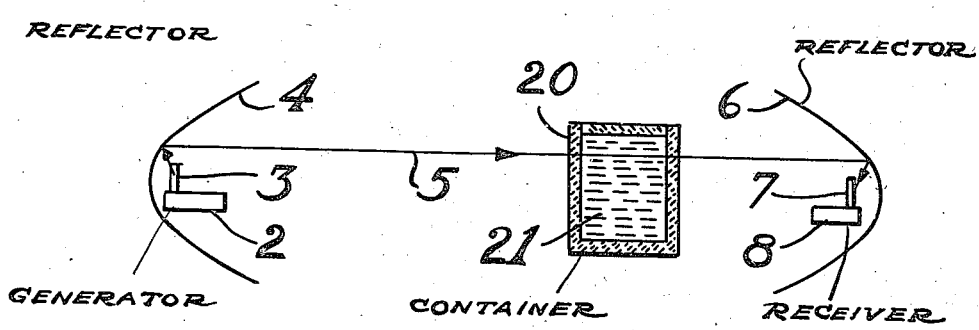
Fig. 5 shows schematically an arrangement whereby short radio waves are directed through a container of material under investigation.

Referring to Fig. 5, a form of the device is illustrated in which a portion of the soil suspected of containing hydrocarbon vapors, or a sample of the atmosphere over an area suspected of containing hydrocarbon capors, is disposed in a suitable container 20. A short wave generator 2 directs waves from its antenna 3 against a reflector 4, which directs the waves through the container 20 and its contents 21. Absorption of the waves is affected by any hydrocarbon gases contained in the soil sample or gas sample 21. The absorption of the waves is determined by directing the waves against a reflector 6 to an antenna 7 and receiver 8, as previously described.

While the invention has been described as applied to the location of oil bearing strata, it will be understood it can be applied to the location of coal bearing formations or any other substances with which are associated volatile constituents, and some of the advantages of the invention will be retained. Also, absorption may be due to gases other than hydrocarbons, which are associated with petroleum, coal and the like.

Various changes and alternate arrangements may be made within the scope of the appended claims, in which it is our intention to claim all novelty inherent in the invention as broadly as the prior art permits.

We claim:

1. The method of geophysical prospecting which comprises passing short electro-magnetic waves, including wave lengths which are capable of being absorbed by hydrocarbons, through a medium associated with the earth in the area to be investigated in such a way as to contain any hydrocarbons which may be passing through said earth, whereby the presence of hydrocarbons in said medium will be indicated by an absorption of energy of the aforesaid wave lengths, receiving said waves after they have passed through said medium and measuring the energy of the received waves.

2. The method of geophysical prospecting which comprises passing short electro-magnetic waves, including wave lengths which are capable of being absorbed by hydrocarbons, through the atmosphere above the earth in the area to be investigated, whereby the presence of hydrocarbons in the atmosphere will be indicated by an absorption of energy of the aforesaid wave lengths, receiving the waves after they have passed through the atmosphere, and measuring the energy of the received waves.

3. The method of geophysical prospecting which comprises passing radio waves, including wave lengths which are capable of being absorbed by hydrocarbons, through the atmosphere above the earth in the area to be investigated, whereby the presence of hydrocarbons in the atmosphere will be indicated by an absorption of energy of the aforesaid wave lengths, receiving the waves after they have passed through the atmosphere, and measuring the energy of the received waves.

4. The method of geophysical prospecting which comprises passing light waves, including wave lengths which are capable of being absorbed by hydrocarbons, through the atmosphere in the area to be investigated, whereby the presence of hydrocarbons in the atmosphere will be indicated by an absorption of energy of the aforesaid wave lengths, receiving the waves after they have passed through the atmosphere, and measuring the energy of the received waves.

5. The method of geophysical prospecting which comprises passing short radio waves, including wave lengths which are capable of being absorbed by hydrocarbons, through a given quantity of soil taken from an area to be investigated whereby the presence of hydrocarbons in said soil will be indicated by an absorption of energy of the aforesaid wave lengths, receiving said waves after their passage through the soil, and measuring the energy of the received waves.

6. The method of geophysical prospecting which comprises passing short electro-magnetic waves, including wave lengths which are capable of being absorbed by hydrocarbons, through a confined volume of atmosphere collected in the area to be investigated, whereby the presence of hydrocarbons in said atmosphere will be indicated by an absorption of energy of the aforesaid wave lengths, receiving said waves after their passage through said atmosphere and measuring the energy of the received waves.

LUDWIG W. BLAU.
WILLIAM B. LEWIS.